US009679705B2

(12) United States Patent
Ma et al.

(10) Patent No.: US 9,679,705 B2
(45) Date of Patent: Jun. 13, 2017

(54) METHOD FOR FABRICATION OF CERAMIC DIELECTRIC FILMS ON COPPER FOILS

(71) Applicant: UCHICAGO ARGONNE, LLC, Chicago, IL (US)

(72) Inventors: Beihai Ma, Naperville, IL (US); Manoj Narayanan, Woodridge, IL (US); Stephen E. Dorris, LaGrange Park, IL (US); Uthamalingam Balachandran, Willowbrook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 21 days.

(21) Appl. No.: 14/631,536

(22) Filed: Feb. 25, 2015

(65) Prior Publication Data

US 2015/0170845 A1    Jun. 18, 2015

Related U.S. Application Data

(62) Division of application No. 12/786,940, filed on May 25, 2010, now Pat. No. 8,974,856.

(Continued)

(51) Int. Cl.
*C04B 35/00* (2006.01)
*H01G 13/04* (2006.01)
(Continued)

(52) U.S. Cl.
CPC ............ *H01G 13/04* (2013.01); *C04B 35/491* (2013.01); *C04B 35/624* (2013.01);
(Continued)

(58) Field of Classification Search
CPC .................................................... C04B 35/491
See application file for complete search history.

(56) References Cited

U.S. PATENT DOCUMENTS

| 5,667,596 A * | 9/1997 | Tsuzuki | H01L 31/048 136/244 |
| 6,337,032 B1 * | 1/2002 | Chivukula | C04B 35/491 252/62.9 PZ |

(Continued)

OTHER PUBLICATIONS

Kim et al., "PZT and PLZT thin films on Cu substrates for dielectric and piezoelectric applications: Effect of processing atmosphere and film strain," 2006, Mater. Res. Soc. Symp. Proc. vol. 902E, pp. 5.1-5.6.*

(Continued)

*Primary Examiner* — Robert Vetere
(74) *Attorney, Agent, or Firm* — Olson & Cepuritis, Ltd.

(57) ABSTRACT

The present invention provides copper substrate coated with a lead-lanthanum-zirconium-titanium (PLZT) ceramic film, which is prepared by a method comprising applying a layer of a sol-gel composition onto a copper foil. The sol-gel composition comprises a precursor of a ceramic material suspended in 2-methoxyethanol. The layer of sol-gel is then dried at a temperature up to about 250° C. The dried layer is then pyrolyzed at a temperature in the range of about 300 to about 450° C. to form a ceramic film from the ceramic precursor. The ceramic film is then crystallized at a temperature in the range of about 600 to about 750° C. The drying, pyrolyzing and crystallizing are performed under a flowing stream of an inert gas.

3 Claims, 6 Drawing Sheets

Related U.S. Application Data

(60) Provisional application No. 61/183,148, filed on Jun. 2, 2009.

(51) Int. Cl.
  *C04B 35/491* (2006.01)
  *C04B 35/624* (2006.01)
  *C23C 18/12* (2006.01)
  *C23C 26/00* (2006.01)
  *H01G 4/12* (2006.01)

(52) U.S. Cl.
  CPC ...... *C23C 18/1204* (2013.01); *C23C 18/1208* (2013.01); *C23C 18/1225* (2013.01); *C23C 18/1241* (2013.01); *C23C 18/1254* (2013.01); *C23C 18/1283* (2013.01); *C23C 18/1295* (2013.01); *C23C 26/00* (2013.01); *H01G 4/1218* (2013.01); *H01G 4/1245* (2013.01); *C04B 2235/3227* (2013.01); *C04B 2235/3232* (2013.01); *C04B 2235/3244* (2013.01); *C04B 2235/3296* (2013.01); *C04B 2235/441* (2013.01); *C04B 2235/443* (2013.01); *C04B 2235/449* (2013.01); *C04B 2235/6562* (2013.01); *C04B 2235/6565* (2013.01); *C04B 2235/6584* (2013.01); *C04B 2235/768* (2013.01); *Y10T 428/24355* (2015.01); *Y10T 428/266* (2015.01)

(56) References Cited

U.S. PATENT DOCUMENTS

| | | | |
|---|---|---|---|
| 6,623,865 B1 | 9/2003 | Zou et al. | |
| 6,921,741 B2 * | 7/2005 | Arendt | C23C 14/081 428/701 |
| 7,029,971 B2 * | 4/2006 | Borland | H01G 4/1218 438/250 |
| 7,074,507 B2 | 7/2006 | Maria et al. | |
| 2001/0014484 A1 | 8/2001 | Duncombe et al. | |
| 2003/0113443 A1 * | 6/2003 | Kingon | H01G 4/1218 427/79 |
| 2004/0129917 A1 * | 7/2004 | Kubota | B41J 2/161 252/62.9 R |
| 2006/0126360 A1 | 6/2006 | Fujimori et al. | |
| 2009/0238954 A1 | 9/2009 | Suh et al. | |

OTHER PUBLICATIONS

Kaufman D.Y. et al., PLZT Film-on-Foil Capacitors for Embedded Passives, Proceedings of the 12th US-Japan Seminar on Dielectric and Piezoelectric Ceramics, 305-308 (2005).

Kingon A.I. et al., Lead Zirconate Titanate Thin Films Directly on Copper Electrodes for Ferroelectric, Dielectric and Piezoelectric Applications, Nature Materials 4, 233-237 (2005).

Kim T. et al., Ferroelectric Behavior in Nominally Relaxor Lead Lanthanum Zirconate Titanate Thin Films Prepared by Chemical Solution Deposition on Copper Foil, Applied Physics Letters 88, 262907-1-262907-3 (2006).

Lee J et al., Imprint and Oxygen Deficiency in (Pb,La)(Zr,Ti)O3 Thin-Film Capacitors with La—Sr—Co—O Electrodes, Appl. Phys. Lett 66 (11), 1337-1339 (1995).

Losego Mark D. et al., Ferroelectric Response from Lead Zirconate Titanate Thin Films Prepared Directly on Low-Resistivity Copper Substrates, Applied Physics Letters 86, 172906 (2005).

Losego Mark D. et al., Importance of Solution Chemistry in Preparing Sol-Gel PZT Thin Films Directly on Copper Surfaces, Chem. Mater. 20, 303-307 (2008).

Ma B. et al., Chemical Solution Deposition of Ferroelectric Lead Lanthanum Zirconate Titanate Films on Base-Metal Foils, J. Electroceram 22, 383-389 (2009).

Schwartz R. et al., Solution Chemistry Effects in Pb(Zr,Ti)O3 Thin Film Processing, Integrated Ferroelectrics, 2, 243-254 (1992).

Schwartz R. et al., Sol-Gel Processing of PZT Thin Films: A Review of the State-of-the Art and Process Optimization Strategies, Integrated Ferroelectrics, 7, 259-277 (1995).

Schwartz R.W. et al., Chemical Solution Deposition of Electronic Oxide Films, C.R. Chimie 7, 433-461, (2004).

Yang G.Y. et al., Effect of Local Oxygen Activity on Ni—BaTiO3 Interfacial Reactions, Acta Materialia 54, 3513-3523 (2006).

* cited by examiner

METHOD FOR FABRICATION OF CERAMIC DIELECTRIC FILMS ON COPPER FOILS

CROSS-REFERENCE TO RELATED APPLICATIONS

This application is a division of U.S. application Ser. No. 12/786,940, filed on May 25, 2010, which claims the benefit of U.S. Provisional Application Ser. No. 61/183,148, filed on Jun. 2, 2009, each of which is incorporated herein by reference in its entirety.

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to preparation of ceramic dielectric films. More particularly, the invention relates to methods for preparation of ceramic dielectric films on copper foils.

BACKGROUND OF THE INVENTION

The development of power electronic devices with improved performance, increased reliability, compact size, and reduced weight requires the passive components to be embedded within a printed wire board (PWB). This technology could free up surface space, increase device reliability, and minimize electromagnetic interference and inductance loss. The capacitance density of a dielectric is proportional to its permittivity or dielectric constant divided by the thickness of the dielectric material. A high capacitance density capacitor can be fabricated by using thin film dielectric of high permittivity. High permittivity (high-K) materials include perovskite ceramics of general formula $ABO_3$, such as crystalline lead zirconate titanate [$Pb(Zr, Ti)O_3$, PZT], lead lanthanum zirconate titanate [$(Pb, La)(Zr, Ti)O_3$, PLZT], lead magnesium niobate [$Pb(Mg_{1/3}Nb_{2/3})O_3$, PMN], barium titanate ($BaTiO_3$, BT), and barium strontium titanate [$(Ba, Sr)TiO_3$, BST]. Thin ceramic films may be deposited on base metal foils, such as nickel and copper. Base metal foils are subject to undesirable oxidation and require low oxygen partial pressures during high temperature annealing for formation of the desired crystalline phase of the ceramic that exhibits high-K. The low oxygen partial pressures, however, can result in complications such as high dielectric losses due to reduction of dielectric materials, suppression of dielectric constant due to reactions between the thin film dielectrics and the substrates of metal foils. Therefore, finding an effective method for the fabrication of high-K dielectric films on metal foils has been a hot research area [1-3]. Zou et al. [1] describe a method of using $LaNiO_3$ (LNO) buffer on a nickel substrate to prevent oxidation at the interface and therefore enable high temperature annealing processes in air. Copper is a preferred substrate due to its ready availability and PWB processing compatibility. Borland et al. [2] describe a method of producing BST films on Cu substrates by chemical solution deposition; and indicate that a suitable oxygen partial pressure of about $10^{-10}$ atm must be maintained during the high temperature annealing. Maria et al. [3] describe a method of controlling the oxygen partial pressure during high temperature annealing by using gas mixtures between CO and $CO_2$ or $H_2$ and $H_2O$, in which the thermodynamic properties of the oxygen-containing substance are used to achieve the desired oxygen partial pressure ($pO_2$) during the high temperature annealing.

Recently, (Pb, La)(Zr, Ti)$O_3$ (PLZT) and Pb(Zr, Ti)$O_3$ (PZT) based perovskite materials deposited directly on copper metal foils have been of great interest because of reduced manufacturing costs achievable by replacing expensive noble metal electrodes in embedded capacitor applications. Traditionally, lead-based perovskite materials have been deposited on expensive Pt/Si substrates by sol-gel synthesis and crystallized at high temperatures in air. The in-air processing capability cannot be extended to perovskites deposited onto copper substrates, because the ease with which copper forms a copper oxide ($Cu_2O$) layer under such processing conditions. The low-permittivity and linear dielectric $Cu_2O$ layer degrades the ferroelectric properties of the resultant capacitor structures. Kingon et al. [4] reported that a strict control of the oxygen partial pressure ($pO_2$) within the thermodynamic processing window ($pO_2$ of about $10^{-13}$-$10^{-17}$ atm) during crystallization is necessary to avoid the formation of copper oxide, while maintaining the high quality and phase integrity of the perovskite material. Losego et al. [5] indicate that careful choice of solution chemistry is important to avoid copper oxidation and microcracking in films made directly on copper substrates. While acetic acid [4-7], alkanolamine [6], and acetylacetone [6], based chelation methods have been used in the literature to deposit films on copper, 2-methoxyethanol (2-MOE)-based chemistry has been reported to promote the desired reactions and can solubilize a variety of different precursors [8].

SUMMARY OF THE INVENTION

The present invention provides a method for the fabrication of PLZT ceramic thin film directly on bare copper substrate to form high capacitance density dielectric sheets for embedding in PWB. The method employs a simple inert gas atmosphere, and does not require a buffer layer with foreign substance (other than the dielectric material used for thin film coating) or a specialized gas mixture for controlling the oxygen partial pressure during high temperature annealing.

The method of the present invention comprises applying a layer of a sol-gel composition onto a copper substrate (e.g., a copper foil). The sol-gel composition comprises a precursor of a ceramic material suspended in 2-methoxyethanol. Typically, the precursor comprises one or more metal salts (e.g., metal carboxylates, metal nitrates, and the like) and/or metal alkoxide materials (e.g., metal isopropoxides or metal propoxides). The layer of sol-gel is then dried at a temperature up to about 250° C. The dried layer is then pyrolyzed at a temperature in the range of about 300 to about 450° C. to form an amorphous film from the chemical precursor solution. Optionally, one or two additional layers of the sol-gel composition can be applied onto the ceramic film, repeating the drying and pyrolysis steps for each additional layer, to build up a thicker ceramic film on the copper substrate. The ceramic film is then crystallized at a temperature in the range of about 600 to about 750° C. The pyrolyzing and crystallizing are performed under a flowing stream of an inert gas (e.g., purified nitrogen) to inhibit copper oxidation. In some embodiments one or more additional layers of the sol-gel composition are applied onto the crystallized ceramic film, and the other steps or the process are repeated for each additional layer.

DETAILED DESCRIPTION OF THE PRESENT INVENTION

Figure 1:
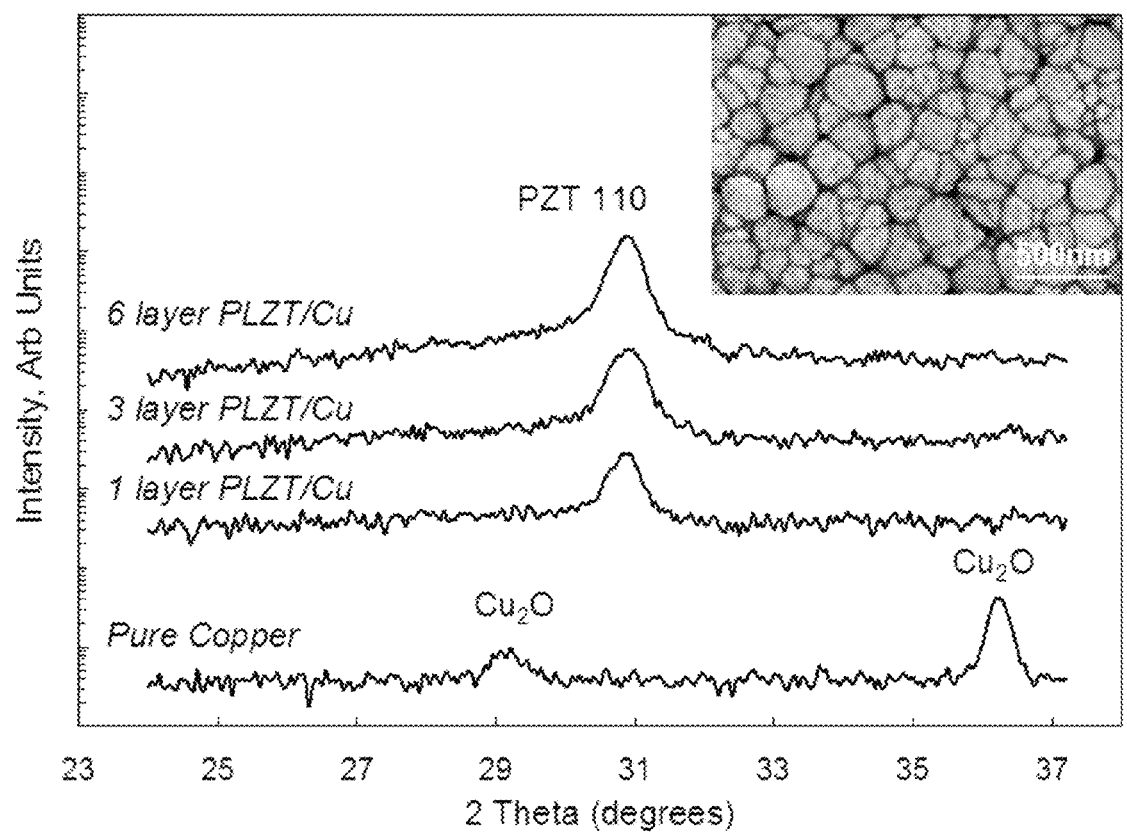
FIG. 1 shows XRD patterns of 1-, 3- and 6-layer PLZT thin films on copper substrates indicating the lack of substrate oxidation. A plain polished copper substrate processed along with the films shows the formation of $Cu_2O$. Inset shows a typical SEM micrograph of PLZT films on copper crystallized at 650° C.

The present invention provides a method for fabricating a ceramic film on a copper foil. The method comprises the steps of: (a) applying onto a copper substrate a layer of a sol-gel composition comprising a precursor of a ceramic material suspended in 2-methoxyethanol; (b) drying the layer of step (a) at a temperature up to about 250° C.; (c) pyrolyzing the dried layer from step (b) at a temperature in the range of about 300 to about 450° C. (e.g., at about 450° C.) to form a ceramic film from the ceramic precursor; (d) optionally applying one or two additional layers of the sol-gel composition onto the ceramic film from step (c) and repeating steps (b), and (c) for each additional layer, to build up a thicker ceramic film on the copper substrate; (e) crystallizing the ceramic film from step (c) at a temperature in the range of about 600 to about 750° C.; and (f) optionally applying one or more additional layers of the sol-gel composition onto the crystallized ceramic film from step (e), and repeating (b), (c), (d), and (e) for each additional layer. The pyrolyzing and crystallizing steps are performed under a flowing stream of inert gas to maintain a suitably low oxygen level. Preferably, the layers of sol-gel composition are applied by spin coating.

Any ceramic material that can be prepared by pyrolysis of a sol-gel composition can be prepared by the methods of the present invention. Non-limiting examples of such ceramic materials include perovskite ceramics of general formula $ABO_3$, such as crystalline lead zirconate titanate [Pb(Zr, Ti)$O_3$, PZT], lead lanthanum zirconate titanate [(Pb, La)(Zr, Ti)$O_3$, PLZT], lead magnesium niobate [Pb(Mg$_{1/3}$Nb$_{2/3}$)$O_3$, PMN], barium titanate (BaTiO$_3$, BT), and barium strontium titanate [(Ba, Sr)TiO$_3$, BST]. In some preferred embodiments, the ceramic material is a PLZT material and the ceramic precursor comprises a lead compound (e.g., a lead salt such as lead acetate), a lanthanum compound (e.g., a lanthanium salt such as lanthanum nitrate), a zirconium compound (e.g., a zirconium alkoxide such as zirconium propoxide), and a titanium compound (e.g., a titanium alkoxide such as titanium isopropoxide).

As used herein, the term "copper substrate" encompasses any copper-containing metallic substance. Preferably, the copper substrate comprises a copper foil, e.g., a metallic foil comprising mainly copper, preferably at least about 90% copper, more preferably at least about 95% copper (e.g., 97%, 98% 99%, or greater). Preferably, the copper foil has a thickness in the range of about 0.01 to about 1 mm (e.g., about 0.2 to about 0.5 mm). Preferably the copper substrate has a polished surface with RMS surface roughness of not more than approximately 10 nm.

Any inert gas capable of maintaining a $pO_2$ of less than about $10^{-6}$ atm can be utilized in the methods of the present invention. One preferred inert gas is a purified nitrogen capable of maintaining a $pO_2$ of less than about $10^{-6}$ atm.

In a preferred embodiment, the method is performed with the optional step (d), and preferably with optional step (f), to build up a thicker ceramic layer on the copper substrate.

A preferred method for fabricating a PLZT ceramic film on a copper substrate of the present invention comprises the steps of (a) applying onto the copper substrate a layer of a sol-gel composition containing a ceramic precursor comprising a lead compound, a lanthanum compound, a zirconium compound, and a titanium compound in 2-methoxyethanol; (b) drying the layer of step (a) at a temperature up to about 250° C.; (c) pyrolyzing the dried layer from step (b) at a temperature in the range of about 300 to about 450° C. (e.g., about 450° C.) to form a PLZT ceramic film from the ceramic precursor; (d) optionally applying one or two additional layers of the sol-gel composition onto the ceramic film from step (c) and repeating steps (b), and (c) for each additional layer, to build up a thicker ceramic film on the copper substrate; (e) crystallizing the ceramic film from step (c) at a temperature in the range of about 600 to about 750° C.; and (f) optionally applying one or more additional layers of the sol-gel composition onto the crystallized ceramic film from step (e), and repeating (b), (c), (d), and (e) for each additional layer. The pyrolyzing and crystallizing steps are performed under a flowing stream of inert gas to maintain a suitably low oxygen level (e.g., purified nitrogen).

The present invention also encompasses ceramic-coated copper substrates prepared by the methods of the present invention (e.g., a PLZT-coated copper substrate), as well as devices comprising the ceramic coated copper materials (e.g., a capacitor comprising the ceramic-coated copper substrate. In some preferred embodiments, the PLZT on the copper substrate has a polycrystalline pervoskite phase without observable copper oxide peaks at 2θ of 29.2 and 36.2 as determined by X-ray diffraction (XRD) analysis.

EXAMPLES

Thin films of $Pb_{0.92}La_{0.08}Zr_{0.52}Ti_{0.48}O_3$ (PLZT 8/52/48) were prepared by sol-gel synthesis using lead acetate trihydrate, titanium isopropoxide, zirconium propoxide, lanthanum nitrate hexahydrate, and 2-MOE. A 20 mol % excess of lead was used in the starting solution to compensate for the lead loss during the high temperature crystallization. A detailed procedure for the solution synthesis is reported elsewhere [9]. Copper substrates (0.5 mm thick; 99.8% pure, ESPI Metals) were polished with a 1 μm diamond paste to a RMS surface roughness of about 5 nm, and then ultrasonically cleaned in acetone and methanol prior to coating. The 0.5M PLZT stock solution was spin coated onto the substrate at about 3000 revolutions-per-minute (rpm) for about 30 seconds (sec) and dried in a furnace at about 250° C. in air for about 10 minutes (min). The film was then pyrolyzed at about 450° C. for about 18 min under flowing $N_2$ (99.999%, 500 standard cubic centimeters per minute, sccm) using a heating and cooling rate of about 4° C./min. The applying, drying, and pyrolysis steps were repeated two more times, and then the sample was crystallized at about 650 to 700° C. for about 18 min (2° C./min ramp rate) in 500 sccm of flowing $N_2$ ($pO_2$ of about $10^{-6}$-$10^{-8}$ atm). This crystallization step, after 3 layers, is important to avoid cracks and realize thicker films. The entire process, up to and including crystallization, was repeated 1-2 times to yield a thicker film. In the case of the single layer sample, the spin, dry, pyrolysis and crystallization was carried out only once. Platinum top electrodes (250 µm diameter and 100 nm thick) were then deposited by electron beam evaporation using a shadow mask. Phase identification was carried out using x-ray diffraction (Bruker D8 XAS system), while microstructural and thickness analysis was obtained using a field emission scanning electron microscopy (FE-SEM; Hitachi S4700). Dielectric measurements were made with an HP 4192A impedance analyzer using an oscillator level of 0.1 V at 10 kHz. A Keithley 237 high voltage source meter and Radiant RT600HVAS were used to measure the leakage current (electric field, E, of about 90 kV/mm), and polarization-electric field (P-E) loops.

The major factors that contribute to the oxidation of copper are the $pO_2$ level, temperature, presence or absence of water, and the choice of solution chemistry employed. It has been reported that $Cu_2O$ can form at temperatures as low as about 250° C. in air [5], but the temperature required for complete removal of organics (pyrolysis) in the films typically is about 300 to about 450° C., depending on the solution chemistry used. Therefore, in the process of the present invention, each layer was first dried at about 250° C. in air and then pyrolyzed at about 450° C. in flowing $N_2$ to avoid copper oxidation. FIG. 1 shows the primary x-ray diffraction (XRD) peaks of one (about 115 nm), three (about 345 nm) and six (about 690 nm) layer PLZT films crystallized at about 650° C. on copper substrates. Only the major PLZT and $Cu_2O$ peaks are shown, while other peaks are omitted for clarity. A plain polished copper substrate was analyzed along with the PLZT samples for the purpose of comparison.

The XRD patterns of the PLZT films in FIG. 1 indicate that only a randomly oriented polycrystalline perovskite phase was obtained, without any copper oxidation. The major $Cu_2O$ peaks (2θ about 29.2 and about 36.2) are absent in the PLZT on copper samples, while considerable oxidation occurred in the plain polished copper substrate. This observation was further confirmed upon physical examination of the samples after crystallization, where the substrates that contained the PLZT films looked reflective to the naked eye, while the surface of the plain polished copper was black due to massive copper oxidation. While the $pO_2$ level ($10^{-6}$-$10^{-8}$ atm) in the furnace during crystallization was thermodynamically conducive to the formation of $Cu_2O$, a single layer (about 115 nm thick) of PLZT was sufficient to avoid $Cu_2O$ formation. Although this finding suggests the existence of a much lower $pO_2$ level locally at the film/substrate interface, similar to that reported by Yang et at for the $Ni$—$BaTiO_3$ system [10], it is also plausible that a single layer may physically act as a barrier layer, limiting the diffusion of oxygen to the interface. This also implies that the strategy of crystallizing a single layer might resolve the cracking issues reported by Losego et al. [6] while still preventing substrate oxidation. The inset of FIG. 1 presents a typical SEM micrograph of the films, with average grain size falling between 150 and 200 nm.

Figure 2:
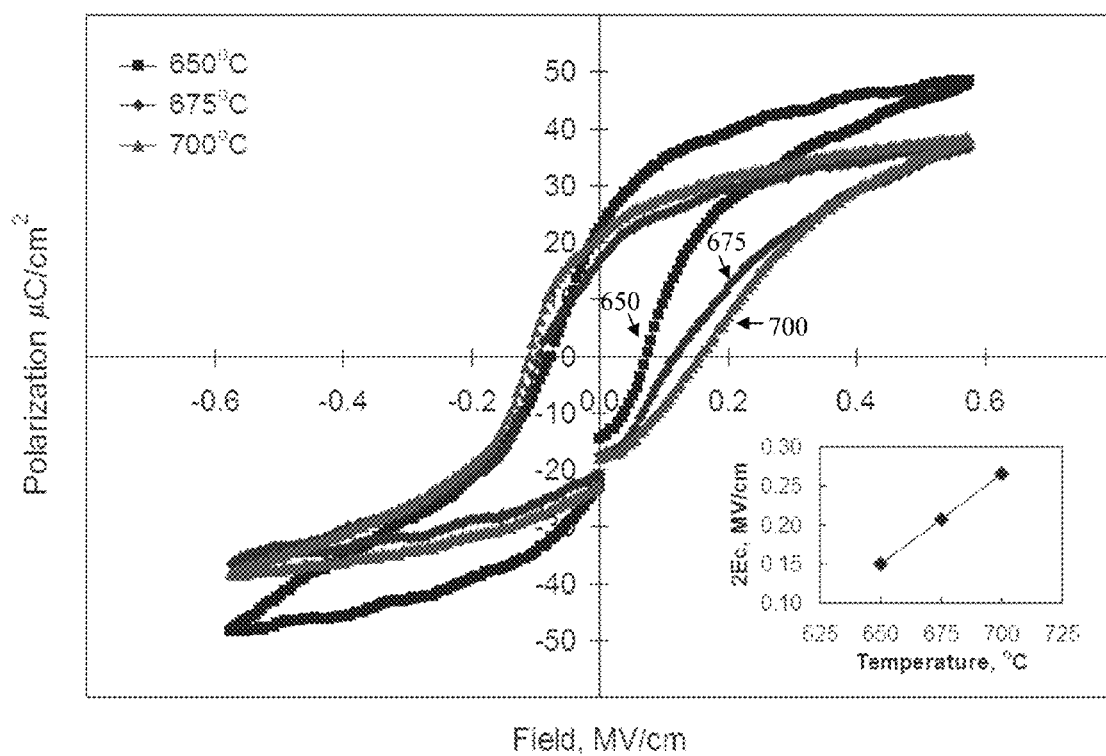
FIG. 2 shows P-E hysteresis loops of 3-layer (345 nm) films crystallized at various temperatures. Inset shows the change in the coercive field ($2E_c$) of the films with crystallization temperature. The top curve, in grey, provides data for films crystallized at 700° C., the middle curve provides data for films crystallized at 675° C., and the bottom curve provides data for films crystallized at 650° C.

FIG. 2 shows the P-E loops of PLZT films crystallized at about 650° C., 675° C., and 700° C. All the films exhibited good ferroelectric behavior, with the loops gradually becoming wider with increasing temperature. Films crystallized at 650° C. exhibited slim and well saturated loops with $P_r$ of about 24 µC/$cm^2$, which is comparable to that of high quality ferroelectric films on Pt/Si [11]. The coercive field increases by about 75% when the crystallization temperature is increased above 650° C., suggesting that the film becomes electrically harder when crystallized at higher temperatures.

Figure 3:
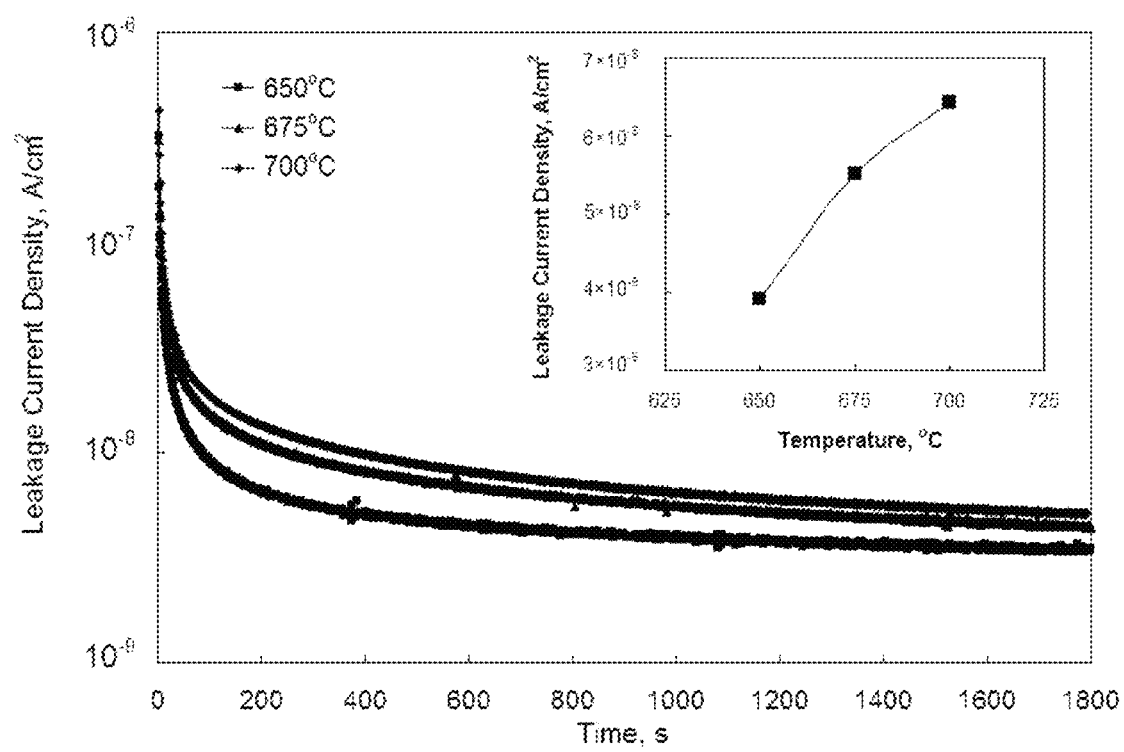
FIG. 3 shows leakage current density as a function of time for 3-layer (345 nm) films crystallized at various temperatures. Inset shows the change in leakage current density (at 1000 seconds) with crystallization temperature.

FIG. 3 shows the leakage current density (at E of about 90 kV/cm) of films crystallized at different temperatures. The typical leakage current density (J) was about $3.9 \times 10^{-9}$ A/$cm^2$ for films made at 650° C. The leakage current density (at 1000 sec) increased by about 65% when the crystallization temperature was increased from 650° C. to about 700° C. It is well known the oxygen vacancy formation in perovskite materials is accelerated with increasing crystallization time and temperature under low $pO_2$ processing conditions. The typical characteristics of oxygen vacancy are the creation of two electrons for charge compensation and the ability to inhibit domain wall movement, which increases the electrical conductivity and the coercive field of ferroelectric materials, respectively. Thus, we attributed the observed increase in coercive field and leakage current, with increasing crystallization temperature, to an increase in the oxygen vacancy concentration in the film. These characteristics are consistent with results reported in the literature [12].

Figure 4:
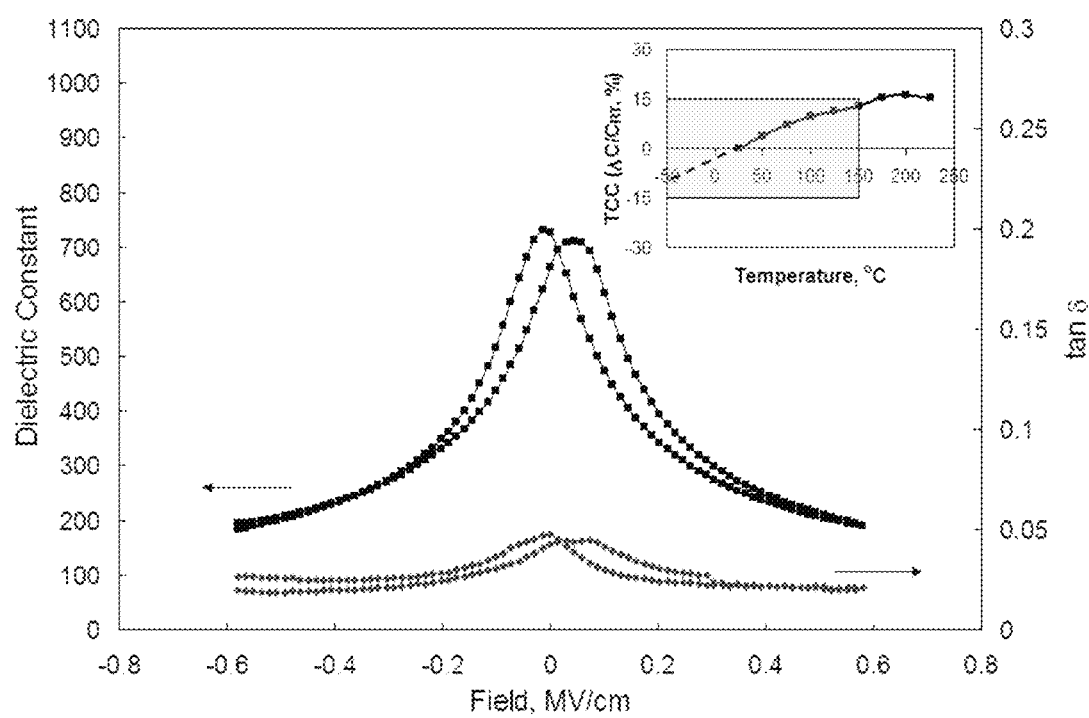
FIG. 4 shows room temperature dielectric response as a function of bias field for 6-layer (690 nm) films crystallized at 650° C. Inset shows the experimental change in the capacitance (Temperature coefficient of capacitance, TCC in %) as a function of temperature of the films crystallized at 650° C. Dotted line indicates extrapolated values. Shaded region represents the tolerance limits of commercially available X8R capacitors.

FIG. 4 shows the dielectric response as a function of bias field for films crystallized at 650° C. These films exhibit well defined hysteresis, saturation at high field and a good dielectric tunability. A dielectric constant of about 730, dielectric loss (tan δ) <0.06 and dielectric tunability of about 70% were typically observed for these films. The measured permittivity values are still lower for this composition than that reported (ε of about 1300) for PLZT on LNO buffered nickel substrates [13].

While not wishing to be bound by theory, it is likely that the increased oxygen vacancy concentration in the film is due to the slow heating and cooling rates (i.e. films were exposed to high temperatures for a longer period) employed in the crystallization step was responsible for the degradation in the electrical properties. This can be avoided by using rapid thermal annealing (RTA) or the direct insertion technique. For example, directly inserting a sample into the furnace at 650° C. for 18 min under 500 sccm of flowing $N_2$ afforded a material with: dielectric constants >900 and dielectric loss <6%. It should also be noted that the improved dielectric response may be a result of increased film densification due to delayed crystallization caused by the rapid heating rate [14]. The inset of FIG. 4 represents the temperature coefficient of capacitance (TCC) of a PLZT film on Cu of the invention along with that of commercially manufactured X8R capacitors (shaded region). To the limits of measurement capability, the TCC for the product of the invention falls within the tolerance limits of the X8R capacitors. The dotted line represents extrapolated values.

Figure 5:
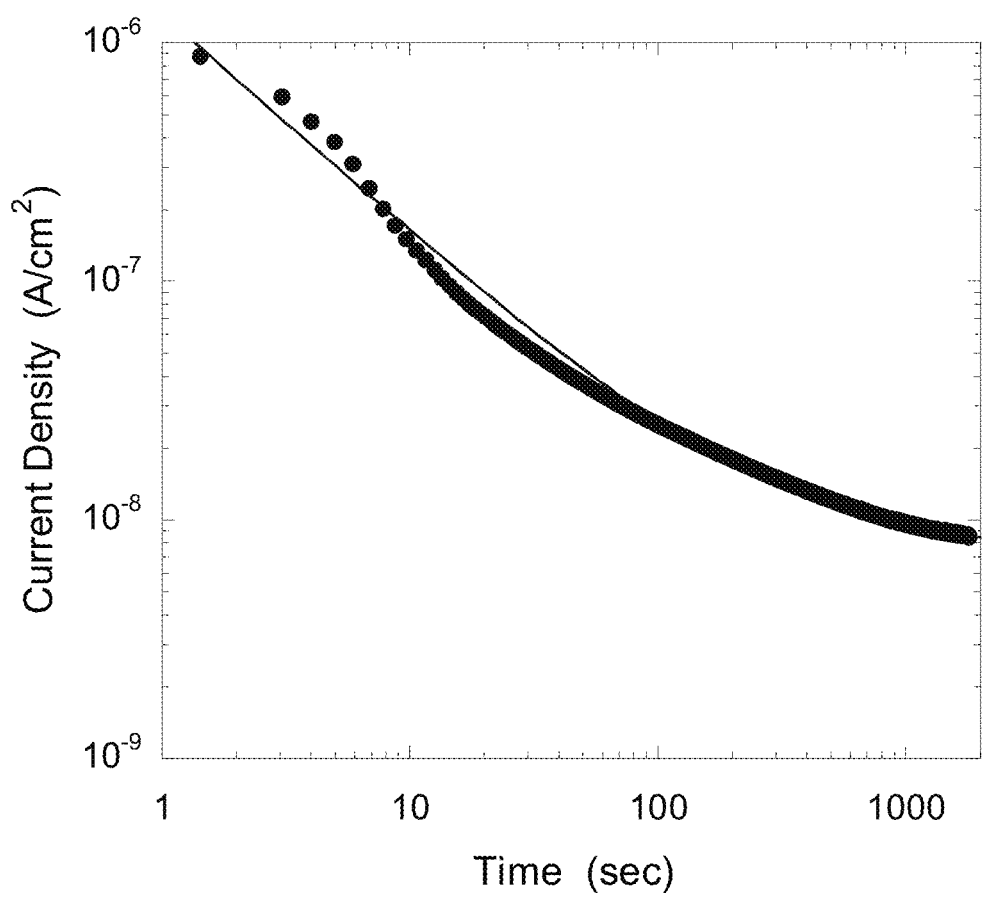
FIG. 5 shows a graph of relaxation current density as a function of time for PLZT/Cu at room temperature.

FIG. 5 shows the relaxation current density measured as a function of time at room temperature with applied electric field E of about 90 kV/cm on Pt/PLZT/Cu capacitor, along with the fitting of the data to Curie-von Schweidler equation (solid line). From the curve, a value of n=0.99 and steady state leakage current density $J_{S=}7.3 \times 10^{-9}$ A/$cm^2$ were obtained.

Figure 6:
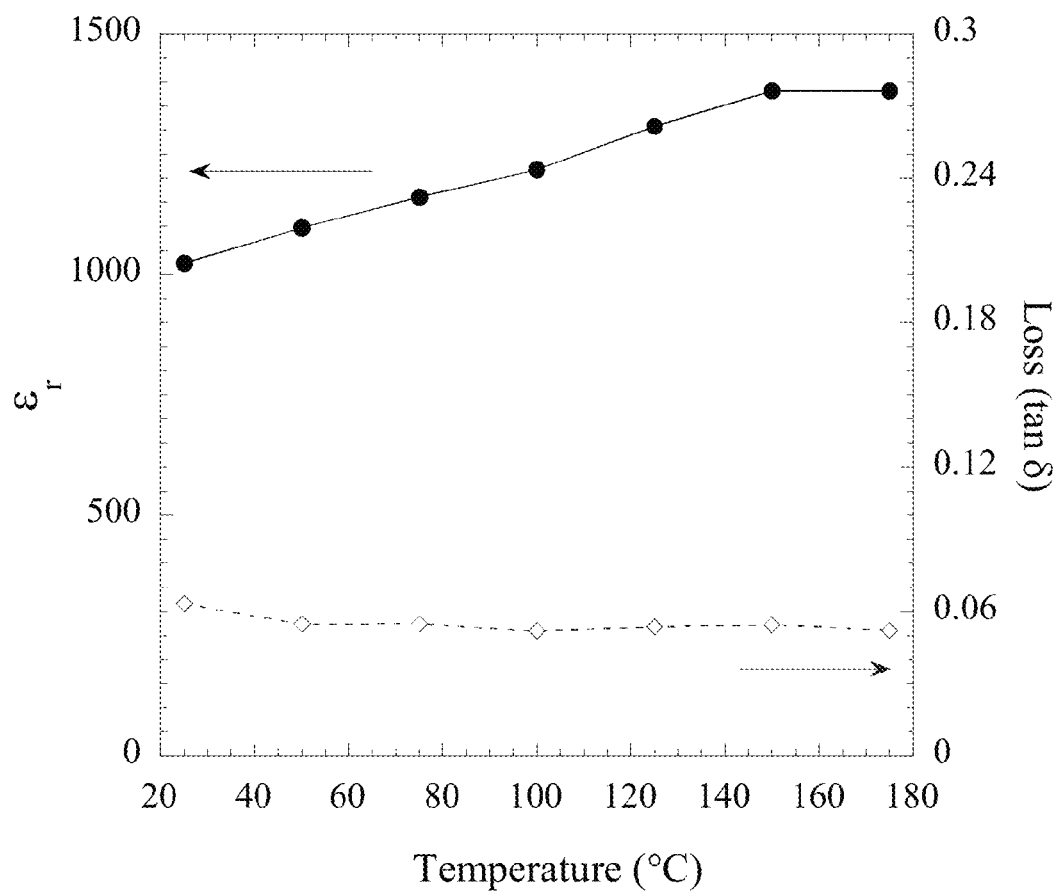
FIG. 6 provides a graph of relative permittivity and dielectric loss as a function of temperature for a PLZT/Cu capacitor.

FIG. 6 shows the relative permittivity and dielectric loss as a function of temperature measured on a 1.2-cm×1.2-cm Pt/PLZT/Cu film-on-foil sample. Relative permittivity increases while dielectric loss decreases with increasing temperature between room temperature and 175° C. A relative permittivity of about 1400 and dielectric loss of about 5% were determined at 150° C. These results measured on Pt/PLZT/Cu are comparable to those obtained on Pt/PLZT/LNO/Ni samples.

In summary, 2-MOE based solution synthesis was successfully used to make PLZT thin films on copper substrates, thus adding to the list of copper-compatible solution chemistries reported in the literature. Surprisingly, a thin layer (about 115 nm) of PLZT film was sufficient to protect the underlying copper substrate from oxidation, implying a larger $pO_2$ processing window than that achievable by thermodynamic control. Device quality PLZT thin films made on copper substrates exhibited the following properties: $\epsilon$ of about 730, tan $\delta$<0.06, J=3.9×10$^{-9}$ A/cm$^2$ and TCC<15%. The change in capacitance falls with in the tolerance limits of commercially available X8R capacitors. Electrical measurements suggest that the oxygen vacancies formed due to low $pO_2$ processing may be responsible for the degradation in the electrical properties, and may be accelerated with increasing crystallization time and temperature. The degradation of the film quality can be reduced by decreasing the time that the sample is exposed to higher temperatures by use of RTA. Initial results with this approach have been encouraging with films exhibiting $\epsilon$>900, tan $\delta$<0.06 and with no copper oxidation.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

REFERENCES

[1] Q. Zou, B. G. Yacobi, H. E. Ruda, M. Farrell, U.S. Pat. No. 6,623,865B1, Sep. 23, 2003.
[2] W. J. Borland, J. F. Ihlefeld, A. I. Kingon, J. -P. Maria, U.S. Pat. No. 7,029,971B2, Apr. 18, 2006.
[3] J. -P. Maria, A. I. Kingon, U.S. Pat. No. 7,074,507B2, Jul. 11, 2006.
[4] A. I. Kingon and S. Srinivasan, *Nat. Mater.* 4, 233 (2005).
[5] M. D. Losego, L. H. Jimison, J. F. Ihlefeld, and J -P. Maria, *Appl. Phys. Lett.* 86, 172906 (2005).
[6] M. D. Losego, J. F. Ihlefeld, and J -P. Maria, *Chem. Mater.* 20, 303 (2008).
[7] T. Kim, J. N. Hanson, A. Gruverman, and A. I. Kingon, *Appl. Phys. Lett.* 88, 262907 (2006).
[8] R. W. Schwartz, T. Schneller, and R. Waser, *C. R. Chimie* 7, 433 (2004).
[9] D. Y. Kaufman, S. Saha, and K. Uprety, *Proc. 12th US Japan Seminar on Dielectric and Piezoelectric Ceramics*, 305-308, Annapolis, Md. (Nov 2005).
[10] G. Y. Yang, S. I. Lee, Z. J. Liu, C. J. Anthony, E. C. Dickey, Z. K. Liu, and C. A. Randall, *Acta Materialia* 54, 3513 (2006).
[11] R. W. Schwartz, B. C. Bunker, D. B. Dimos, R. A. Assink, B. A. Tuttle, D. R. Tallant, and I. A. Weinstock, *Integr. Ferroelectr.* 2, 243 (1992).
[12] J. Lee, R. Ramesh, V. G. Keramidas, W. L. Warren, and G. E. Pike, *Appl. Phys. Lett.* 66, 1337 (1995).
[13] B. Ma, D -K. Kwon, M. Narayanan, and U. Balachandran, *J. Electroceram.* 22, 383-389 (2009).
[14] R. W. Schwartz, T. J. Boyle, S. J. Lockwood, M. B. Sinclair, D. Dimos, and C. D. Buchheit, *Integr. Ferroelectr.* 7, 259 (1995).

The embodiments of the invention in which an exclusive property or privilege is claimed are defined as follows:

1. An article of manufacture of comprising a lead-lanthanum-zirconium-titanium (PLZT) ceramic film on a copper substrate wherein the PLZT has a polycrystalline pervoskite phase without observable copper oxide peaks at 2θ of 29.2 and 36.2 as determined by X-ray diffraction (XRD) analysis; wherein the PLZT has a composition with the empirical formula $Pb_{0.92}La_{0.08}Zr_{0.52}Ti_{0.48}O_3$.

2. The article of manufacture of claim 1, wherein the copper substrate comprises a copper foil having a thickness in the range of about 0.01 mm to about 1 mm.

3. A capacitor comprising the article of manufacture of claim 1.

* * * * *